PULSE ELECTRONIC SWITCHING SYSTEM

Filed March 24, 1948 5 Sheets-Sheet 1

Inventors
STANISLAS VAN MIERLO
BORIS DERJAVITCH
By [signature]
Attorney

PULSE ELECTRONIC SWITCHING SYSTEM

Filed March 24, 1948 5 Sheets-Sheet 2

Inventors
STANISLAS VAN MIERLO
BORIS DERJAVITCH
By [signature]
Attorney

PULSE ELECTRONIC SWITCHING SYSTEM

Filed March 24, 1948 5 Sheets-Sheet 3

Inventors
STANISLAS VAN MIERLO
BORIS DERJAVITCH
By R.P. Morris
Attorney

May 12, 1953 S. VAN MIERLO ET AL 2,638,505

PULSE ELECTRONIC SWITCHING SYSTEM

Filed March 24, 1948 5 Sheets-Sheet 4

Inventors
STANISLAS VAN MIERLO
BORIS DERJAVITCH
By R. P. Morris
Attorney

May 12, 1953 S. VAN MIERLO ET AL 2,638,505

PULSE ELECTRONIC SWITCHING SYSTEM

Filed March 24, 1948 5 Sheets-Sheet 5

Inventors
STANISLAS VAN MIERLO
BORIS DERJAVITCH
By
Attorney

Patented May 12, 1953 2,638,505

UNITED STATES PATENT OFFICE 2,638,505

PULSE ELECTRONIC SWITCHING SYSTEM

Stanislas Van Mierlo, Antwerp, Belgium, and Boris Derjavitch, Paris, France, assignors to International Standard Electric Corporation, New York, N. Y., a corporation of Delaware Application March 24, 1948, Serial No. 16,778
In France March 26, 1947

10 Claims. (Cl. 179—15)

The present invention relates to impulse electronic switching systems and more particularly to such systems to be used in relation with telephone or telegraph exchanges.

One object of the present invention is the use of an arrangement of "distributors" in electronic impulse switching systems for the automatic connection of two or several telephone sub-stations.

"Distributors" have been used in the Baudot telegraph system in which two telegraph sub-stations are connected at a regular time interval by means of a transmission system common to several sub-stations in the same group. Each pair of sub-stations has at its disposal this transmission system at regular time intervals for a short time interval during which a signal may be exchanged between the two stations.

In the case of the Baudot telegraph system the connection of the sub-station is made by means of mechanical distributors provided at both ends of the circuit whose brushes revolve synchronously. Although mechanical arrangements may be used in the present invention electronic means are preferred and according to a feature of the invention the distributor consists of an electron beam striking successively a series of electrodes.

In the embodiment of the present invention described the transmission of voice currents or other signals is made by means of impulses of extremely short duration.

Two different ways of sending messages by means of impulses may be used: the impulses may be transmitted at regular time intervals and modulated in amplitude or they may be of constant amplitude but time modulated.

It is known that this second type of pulses offers certain advantages such as a better signal/noise ratio, easier amplification and adjustment of the output level, but the first type leads to simpler embodiments and gives satisfactory results in most of the cases which will be considered in relation to electronic switching, and this type of modulation will be used in the embodiment described.

It is known that it is possible to obtain a sufficient approximation with two or three impulses for the highest frequency to be transmitted. For the transmission of speech 8,000 impulses per second are considered as sufficient. To obtain the final message currents it is sufficient to apply these impulses to a low pass filter which reconstitutes the original voice frequency.

It may be noted that in the case of telephony the subscriber set may be somewhat different from the sets used at present, the dial may for instance be replaced by push buttons or other means by which the subscriber may dial the number of the wanted substation.

One object of the present invention is a switching system for a relatively large number of subscribers in which means are used to delay the speech impulses with a high degree of precision.

According to one feature of the invention, there is provided for the seizure of the connecting circuits a circuit such that when the subscriber lifts up his receiver the first impulse is directed to a free connecting circuit and the succeeding impulses of the same subscriber can reach only the same connecting circuit, and such that when a connecting circuit is busy the impulses from another subscriber are directed to another connecting circuit, thus avoiding double connections.

According to other features of the invention means are provided to delay the impulses by successive selections according to the number of the wanted subscriber, a first selection corresponding for instance to the hundreds, a second to the tens and a third to the units.

The circuits will also be described for supplying the various tones such as "busy" tone, "ringing" and "ringing back tone" etc.

Other features and objects of the invention will be apparent from the following description of an embodiment described in relation with the drawings in which:

Figs. 5, 6 and 7 are assembled together.

Figure 1:
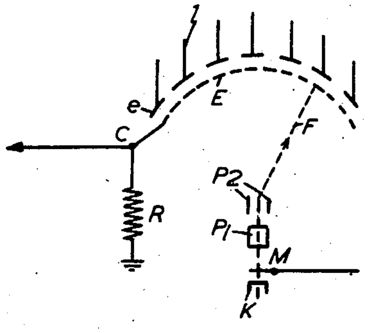
Fig. 1 shows an electronic distributor.

As explained above electronic distributors are used to connect together subscriber sets belonging to a group of subscribers connected to the same distributor. The distributor located in the exchange office is shown schematically in Fig. 1. On this figure M is the modulating electrode of an electron gun, K is the cathode of the tube, F the electron beam which periodically sweeps a series of electrodes *e* respectively connected to telephone lines by means of deflecting plates P1 and P2.

The electron beam is therefore successively connected to the different lines and an impulse is applied to each line when the corresponding electrode is struck by the beam. The intensity of the beam may be modified by any known means and the impulses applied to the lines may also be variable in amplitude so as to transmit the message from the exchange to the telephone sets successively connected to each line 1.

When speech is to be sent in the other direction use is made of a common electrode E constituted for instance by a thin conductive coating or by a grid or by a perforated plate. This electrode may be traversed by the electron beam if an appropriate potential is applied to it.

The surface of the electrodes $e$ is such that they release secondary electrons when they are struck by the electron beam. Secondary electrons are collected by the common electrode E and cause potential fluctuations at a common point C connected to the ground through a resistance R.

The amount of secondary electrons collected by electrode E depends on the difference of potential between electrodes $e$ and the common electrode E, that is to say on the potential of electrodes $e$ with regard to the ground.

In this way the potential variations of electrodes $e$ produced by the microphone of the subscriber set correspond to potential fluctuations at the common point C and the message from the telephone set may be sent to the exchange by means of a series of amplitude modulated impulses.

Figure 2:
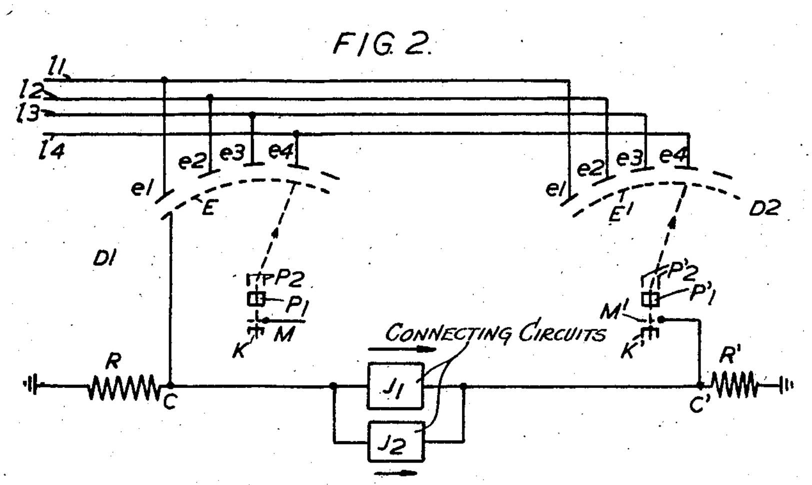
Fig. 2 shows an embodiment comprising two synchronized electronic distributors.

Fig. 2 shows a schematic of a complete installation. The lines are connected to the electrodes $e$ of electronic distributors D1 and D2 and these electrodes are swept in synchronism by the electron beam from cathodes K and K' by means of deflecting plates P1, P2 and P'1, P'2 respectively.

On Fig. 2 the electron beams are shown at the moment when they strike electrodes $e4$. If it is assumed that each electron beam rotates at a speed of P revolutions per second, corresponding to a period of duration T, each telephone line 1 is characterized by the position of its electrode $e$ in the field of the beam and therefore by the instant $t$ of period T when the beam strikes the electrode.

At the moment when the beam distributor D1 passes over an electrode such as $e_m$ a potential will appear at the common point the value of which depends on the potential of electrode $e_m$ i. e. on the voice current of the microphone $P_m$ of the subscriber.

It will be assumed that a subscriber $P_m$ (not shown) connected to line $l_m$ and characterized by an instant $t_m$ of period T, wishes to talk with a subscriber $P_n$ (not shown) connected to line $l_n$ characterized by an instant $t_n$ of period T. The impulses received at point C will then be transmitted to the modulating grid M' of distributor D2 by means of a connecting circuit J1 which is operative only at the instant $t_m$ and which comprises an arrangement delaying the impulses by $t_n-t_m$ if $t_n>t_m$ or $T-(t_m-t_n)$ if $t_n<t_m$. These impulses go from point C' connected on the other hand to the ground by a resistance R' and influence the intensity of the electron beam of the electronic distributor D2 at instant $t_n$ when this beam passes over electrode $e_n$. They generate therefore on line $l_n$ impulses, the amplitude of which is determined by the microphone currents of the subscriber $P_m$. In the same way the microphone currents of subset $P_n$ make the potential of point C vary and the impulses produced undergo a delay of $T-(t_n-t_m)$ if $t_n>t_m$ or $t_m-t_n$ if $t_m>t_n$ through a connecting circuit J2 which is made operative only at instants $t_n$, to reach line $l_m$. It will be noted that the electrodes $e$ of distributor D2 do not necessarily emit secondary electrons since the common electrode E' is not used.

Figure 3:
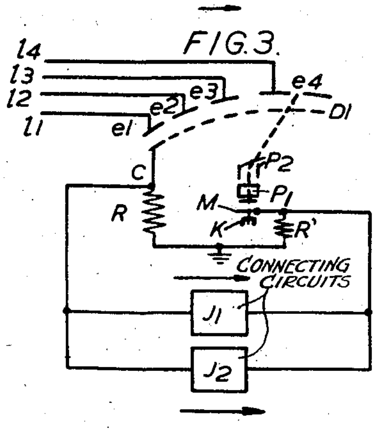
Fig. 3 shows a circuit in which a single electronic distributor is used.

It is possible to simplify the circuit of Fig. 2 by using only one distributor as shown in Fig. 3 in which the same elements are designated by the same reference numerals as in Fig. 2.

In the preceding schematics it has been assumed that the original impulses are delayed by a sufficient length of time to be transmitted at the appropriate instant to the other subscriber. It is also possible to reconstitute first the original signals in the connecting circuit and to only let go portions of these signals through an electronic gate which is opened at the appropriate moment. The portions of the signals going through are new impulses which are produced at the instants characterizing the subscribers.

If it is assumed that the subscriber $A_m$ speaks, the potential of electrode $e_m$ varies with corresponding fluctuations of the electron beam at instants $t_n$ and therefore produces potential fluctuations of electrode $e_n$. These variations react on the beam at instants $t_m$ and increase or decrease the amount of the original fluctuations of the potentials of electrode $e_m$ with a risk of completely distorting the original currents.

Such an effect is avoided if use is made of two distributors, one for the incoming and one for the outgoing signal; these distributors may be connected to a directional device such as, for instance, balanced transformers of the kind used in telephony, but this entails an increase in the equipment.

Another method is to use a compensating arrangement adapted to produce each time the beam is modulated a potential difference equal and of opposite sign to the potential variation of the collecting electrode by the variation of amplitude of the beam. In this case the signals received from the subscribers are not modified but no signal is received at the exchange if the potential variations of the collecting electrode are due to these variations of the electron beam.

In order to be able to establish several connections at the same time between telephone sets connected to the distributor a certain number of connecting circuits are necessary, all connected in parallel, but which are connected electrically to the common equipment only at instants $t$ of the cycle T which characterize respectively the different subscribers connected by this circuit.

Having thus described the method used an embodiment will now be described incorporating features of the invention shown in Fig. 4 of the drawings.

The embodiment may be divided into four principal sections:

(1) A group of subscriber lines shown schematically by box I, these lines being characterized by the position of their respective electrodes $e$ in the line distributor 20, i. e. by the instant $t$ corresponding to these electrodes in a sweep cycle T.

(2) In box II the equipment common to all the subscriber lines and the connecting circuits.

(3) In box III a connecting circuit comprising the calling junctions $J_A$ and the answering junctions $J_R$ respectively associated with speech circuits $B_A$ and $B_R$. For the sake of clarity only one connecting circuit has been shown in toto.

(4) In box IV a register circuit E1 and E2 and a busy test circuit OC.

On this figure the following designations have been used to differentiate between the elements of each of the four groups; the elements shown in box I are designated by indexes beginning with numeral 1, those of box II by indexes beginning with numeral 2 and so on for boxes III and IV. On the other hand the electronic gates have been designated by signs similar to those used for relay contacts. The armatures are shown in their rest positions; when a contact is shown closed the corresponding circuit is closed when no impulse is applied to the relay controlling this contact; when the contact is shown open the corresponding circuit is interrupted when no impulse is applied on the relay controlling this contact.

The shape of the impulses flowing through some conductors has been shown on the drawing with the indication of their position with regard to time in the sweep cycle, $t_m$ designates the characteristic instant of the calling subscriber $A_m$ and $t_n$ the characteristic instant of the called subscriber $A_n$.

When a subscriber $A_m$ lifts his receiver the corresponding electrode in the electronic distributor 20 is at a given potential and at each passage of the electron beam over this electrode an impulse appears at point C. This impulses thus generated reach one of the pairs of free connecting circuits, e. g. circuits $J_A$ and $J_R$. When circuit $J_A$ is busy it remains unoperative for all impulses which do not reach it at instants $t_m$ by lead 231, but it receives the impulses arriving at instants $t_m$. The amplitude of these impulses is constant as long as the subscriber does not use his dial or does not talk. Their frequency is equal to the number of revolutions per second of the electron beams and they occur at a time $t_m$ with respect to the origin of the sweep period T.

Each connecting circuit is associated with a register circuit E1, E2 and as soon as the exchange is ready to register the number of the called subscriber $A_n$, a signal is sent by means of impulses which modulate the electron beam at instants $t_m$, i. e. when this beam passes over the electrode connected to subscriber $A_m$. When the subscriber $A_m$ hears this signal, he dials a number. This causes variations of potential of electrode $e_m$ connected to subset $A_m$ and digits are received by the register in the form of a sequence of impulses. These digit signals are received in their original form by the use of a low pass filter.

The register is actuated according to the number dialled and sends impulses at instants $t_n$ corresponding to the line of the called subscriber. If this called subscriber is free his ringer is operated, if he is busy the calling subscriber gets the busy tone.

When the called subscriber lifts his receiver the circuit is in talking condition and energizes talking circuits $B_A$ and $B_R$. When the calling subscriber hangs up the circuit goes back to rest. The control of the call remains therefore with the calling subscriber.

Having now pointed out the main features of the operation of the circuit, Fig. 4 will now be described in detail.

A number of subscriber telephone sets, one of which is shown at $A_m$, are connected to the secondary emission electrodes $e$ of the single distributor 20 corresponding to the distributor D1 of Fig. 3. The electrodes $e$ are normally at a positive potential and the collecting electrode E at zero potential. When the subscriber $A_m$ lifts his receiver he closes a D. C. circuit comprising the central battery B, the individual resistance $R_L$ and $R'_L$, the line and the subset $A_m$. The electrode $e_m$ of this line is then at a negative potential and when the subscriber talks this potential fluctuates accordingly. The electron beam F emitted by cathode K and which may be modulated by grid 204, corresponding to electrode M of Figs. 1, 2, 3, passes through the openings of collecting electrode E and strikes successively the electrodes $e$ which emit secondary electrons. The number of these electrons which are collected by electrode E depends on the potential difference between $e$ and E. These secondary electrons flow in the circuit: $e_m$, $R_L$, B, R, C, E, and induce a negative potential at point C. Before the subscriber lifts his receiver the electrode $e$ is positive with respect to electrode E, very few secondary electrons being collected by the common electrode E and the potential at point C at instant $t_m$, which is characteristic of subscriber $A_m$, may be very low. When the subscriber lifts his receiver and thus brings electrode $e_m$ to a potential lower than that of electrode E many electrons may be collected by electrode E and the potential at point C may be substantially lower than O, i. e. that negative impulses 70 take place at point C at instants $t_m$, the amplitude of which varies when the subscriber speaks.

A device 23 transforms the negative impulses 70 into positive impulses 71. These impulses are sent simultaneously to all the connecting circuits of the exchange by a conductor 231 connected to a point A at the output of device 23.

When subscriber $A_m$ is listening, beam F generates impulses on electrode $e_m$. In each subscriber line is provided a low pass filter comprising an inductance $i$ and a condenser $C_L$, so that only the amplitude variation of the impulses received in electrode $e_m$ is transmitted to the line and to the subscriber set $A_m$. As long as the other subscriber does not speak the intensity of the beam F is constant, the amplitude of the impulses on electrode $e_m$ is constant and the subscriber $A_m$ does not receive any signal. When the subscriber $A_n$ speaks the beam is modulated and the modulating frequencies reach subset $A_m$. To avoid an harmful reaction of the beam modulation on the incoming signal and therefore on the original potential of electrodes $e$, the device 23 is provided with a compensating device which may produce, under the control of the potential variations of grid 204 of distributor 20, potential variations equal and opposite to those induced by the action of the beam on the potential of point C.

This compensating arrangement may comprise for instance a vacuum tube, one grid of which receives the incoming impulses from conductor 212 and the other grid the outgoing impulses from conductor 221 by means of a resistance 235 of appropriate value so as to obtain the desired compensation. It is clear however that other compensating arrangements can be used.

The operation of the connecting circuits will now be explained. A device 240 can interrupt the direct connection between conductors 231 and 242 by a potential applied to lead 244, but in this case the impulses 71 from point A can still reach another connecting circuit by conductor 52 if device 307 will let them go through. On the other hand the impulses 71 may reach a point D if the circuit element 302 will let them pass, and the connecting circuit $J_A2$ if the circuit element 301 will let them pass. The circuit elements 240, 307, 302, 301 are controlled by potentials applied respectively on conductors 35, 34, 32 and 33 by the control circuit 300. Impulses 71 can pass through conductors 232 and 52 and gate 307 to point D on conductor 39, towards filter 401 through conductors 37 and 38 and towards filter 352 by conductor 37.

If we assume that the first connecting circuit $J_A$ is not busy, and that no other subscriber has lifted his receiver, the impulse 71 which follows the unhooking of the receiver by subscriber $A_m$ goes through contact 240 which is at rest and closed, conductor 242 and contact 302 which is also at rest and closed, and it then enters the control circuit 300 which operates. It may be noted that this impulse cannot reach the next connecting circuit because contact 301 is open.

The control circuit 300 transforms all the impulses received at point D by conductor 31 into impulses transmitted respectively to conductors 32, 33, 34 and 35 to operate this circuit, and to 36 for the control of the busy test circuit OC. By conductor 32 an impulse 75 opens contact 302 during the time interval separating two successive impulses $t_m$ coming from subscriber $A_m$, while, by conductor 33, an impulse 80 closes contact 301 during the same time interval. An impulse 78, applied on conductor 34, closes contact 307 during a time interval equal to the duration of a channel impulse at the moment when the following $t_m$ impulse must arrive. An impulse 79, applied to conductors 35 and 244, opens contact 240 during the time interval when the following impulse of the same subscriber arrives.

After the passage of the first impulse 71 the fact that contact 302 is open and contact 301 closed denotes the busy condition of the connecting circuit during the time interval separating two successive impulses at instants $t_m$, this interval being equal to $T-\Delta t$, where T is the duration of a sweep cycle and $\Delta t$ the duration of an impulse. At the end of this time interval and when the following impulse 71 arrives the impulse 79 from the control circuit 300 opens contact 240 as explained above and prevents this impulse from disturbing another connecting circuit. On the other hand the impulse 78 coming from the control circuit through conductor 34 closes contact 307 so that, at the output of circuit 23, all the impulses 71 which follow the first impulse go through point A, conductor 232, conductor 52, contact 307, conductor 39, point D and conductor 31 to reach the control circuit 300. Each of these impulses causes, like the first one, the operation of the control circuit and the transmission of the various control impulses sent on conductors 32, 33, 34 and 35. A steady condition is then reached in which each impulse 71 prepares the way for the next impulse 71 until the calling subscriber hangs up. At this moment the control circuit does not receive any more impulses 71, goes back to rest and frees the connecting circuit.

If another subscriber calls while the first connecting circuit is busy the first corresponding impulse 71′ passes over contacts 240 and 301, conductor 243, etc. until the first free connecting circuit is reached, since the impulses 75 on conductor 32, and impulses 80 on conductor 33, produced by impulses 71 at instant $t_m$, open contact 302 and close contact 301, sending the impulse 71′ of the new calling subscriber to the next connecting circuits.

Impulses 71 of subscriber $A_m$ cannot disturb other connecting circuits since contact 240 and contacts such as 307 of these circuits are open at instants $t_m$.

In the case, when the first connecting circuit becomes free, the impulses corresponding to the subscribers connected to the other connecting circuits cannot reach this first circuit since contacts 240 is open at each instant characterizing these subscribers, but a new call will generate impulses $71_p$ at an instant of the sweep cycle which is different, and these impulses reach contact 240 when it is closed and will therefore be able to seize the first connecting circuit.

In case of overload, i. e. when all the connecting circuits are busy, the impulses corresponding to the last subscriber will pass through conductor 242, contact 301, conductor 243, contact 301 of the next connecting circuit and so on until the last connecting circuit. These impulses are lost until a calling subscriber hangs up and a connecting circuit is thus made free. The impulses of the waiting call then seize the circuit.

Junctions $J_R$ are used to reach the called subscriber but instead of being controlled by impulses coming from the calling subscriber, they are controlled by impulses 84D from the register as will be described below.

The electronic gate 240 is also closed at the instant characterizing the called subscriber by means of impulses sent on conductors 43 and 244 as will be explained below. In this way a connecting circuit cannot be found busy by the impulses from the called subscriber when he lifts his receiver.

After the seizure of the connecting circuit $J_A$ by subscriber $A_m$ the impulses 71 are directed to register EI associated with this circuit. Since this register is at rest contact 421 of one of the step-by-step switches is closed. On the other hand contacts 318 are closed and the tone tells the calling subscriber that he may begin to dial through the following circuit: tone generator 24, contact 421, contact 318, contact 320, conductor 221, grid 204. Contact 320 is closed at instant $t_m$ under the control of impulse 71 coming from conductor 53. This tone changes the potential of grid 204 and modulates the electron beam F of the electronic distributor 20. When the calling subscriber hears his tone, he can dial and send the dialling signals by means of impulses 71 through conductors 232, 52, contact 307 and conductors 37 and 38. These impulses reach filter 401 where the original signals are regenerated.

These signals, corresponding for instance to a three figure number operate in a known manner the step-by-step selector switches of register EI, which assume positions corresponding to the digits sent by the subscriber. As soon as the first digit has caused the first step-by-step switch to move brush 421 interrupts the tone circuit when it leaves its rest position. The step-by-step switches adjust a number of retardation lines, three in the case of the figure, 423, 424, 425 by means of circuit 412, 413, 414 respectively. After the reception of the last digit, relay 403 of the register operates. This relay operates with some delay, a few tens of milliseconds, and closes a number of circuits which remain operated while the register is busy. The adjustment of this relay 403 is such that its contact 432 is closed a few milliseconds before contact 434 opens and contacts $433_t$ and 435 are closed after contact 434 is opened. By the adjustment of the retardation lines corresponding to the positions imparted to the step-by-step switches by the digit sent by subscriber $A_m$ impulses 84D are produced at instants $t_n$ corresponding to the called subscriber.

It is possible to use a set of retardation lines connected in series and designed with the same degree of precision for the long and short delays, but it is preferably to use the arrangement shown in the drawing which operates as follows:

A circuit 21 supplies the registers with a certain number of different impulses corresponding respectively to 10, 100, 1000 time intervals $t$ separating the scanning of two successive lines. In the particular case considered here it is assumed that a subscriber is characterized by a three figure number and that circuit 21 supplies three kinds of impulses: impulses L1000 on conductor L1000 which are generated at the beginning of each sweep cycle at intervals of $1000\times t$, impulses L100 applied to a conductor L100 at intervals equal to $100\times t$ at a rate of ten per sweep cycle, and impulses L10 applied to conductor L10 and occurring 100 times per cycle at intervals of $10\times t$. By means of retardation lines 423, 424, 425 respectively it is possible to retard an impulse of any predetermined amount. Let, for example 532 be the called number, its characteristic instant is 532T.

As soon as contact 432 of relay 403 is closed an impulse L1000 from circuit 21 arriving through conductor L1000 and contact 432 reaches the retardation line 423 controlled by the first step-by-step switch. The number of sections of the retardation line 423 in circuit depends on the position assumed by this step-by-step switch and corresponding to the number of hundreds in the called number, each section of retardation line 423 being one tenth of the duration of the sweep cycle i. e. $100t$. In the example chosen the impulse L1000 will be delayed by $5\times 100\times t$ at the output of the retardation line 423. Let T1 be this impulse. This impulse is then sent to circuit 413 associated with the second step-by-step selector and controls an electron gate which is shown on the figure as contact 413. Of all the impulses L100 present on conductor L100 only the one which arrives at the same time as T1 will pass. This selected impulse L100 will be delayed by the sections of the retardation line 424 which are put in circuit by the second step-by-step switch in the position in which it is at this time. In the example chosen this delay will be $3\times 10\times t$ and an impulse T2 is thus obtained at instant $5\times 100\times t+3\times 10\times t$. This impulse T2 is applied in its turn to the electronic gate represented by contact 414. It is seen that the gate 414 will open at the instant $530t$ after the beginning of the cycle.

Of all the impulses L10 arriving from conductor L10 and applied to circuit 414 only the one arrives at the same time as impulse T2 will pass, i. e. at instant $530t$. The impulse L10 thus selected will in its turn be delayed by the section of line 425 put in circuit by the third step-by-step switch. In the example described the last delay will be $2\times t$. Therefore we obtain at the output of register E2 a final impulse 84D delayed by $532t$ with respect to the beginning of the sweep cycle. This succession of selections is repeated at each sweep cycle of the distributor.

Thus impulses 84D are received on conductor 54 at instants $t_n$ corresponding to the called subscriber and these impulses close contact 308 at these moments.

If the called subscriber is already busy impulses are present on line 244 at instants $t_n$ which, by conductor 50, contact 433r and conductor 49 reach relay 308 whose contact corresponding to conductor 46 is closed at instants $t_n$ as seen above. These impulses $t_n$ from conductors 244 and 50 pass through contact 433r, contact 308, conductor 46, contact 434, which is still closed, and conductor 55 to the busy test circuit OC. It has been seen that contacts 433r and 434 of relay 403 are open with a delay of a few milliseconds after the closing of contact 435 so as to permit the generation of impulse 84D and the operation of the device 308. This delay permits also a busy test of the called subscriber by the change brought about in the condition of circuit 416 by impulses $t_n$. Arrangement 416 is a "flip flop" circuit well known in the art. In the case when subscriber $A_n$ is busy, the arrangement 416 swings, closes contact 417, opens contact 419 and changes by conductor 47 the condition of circuit 308 which opens until the corresponding $J_R$ circuit is free. Moreover the device 416 opens contact 422 to avoid mixing the busy tone with the ring back tone. It follows that in the busy condition relay 308 is operated by local impulses 84D applied to it by conductor 54 only for a short time interval, to make possible the busy test. After this test locking of device 308 by the impulses sent on conductor 47 prevent the impulses $t_n$ from the busy subscriber, which arrive from conductor 232, through conductor 51 and contact 433t, to reach circuit BR by conductor 40. Therefore if the calling subscriber does not hang up he cannot overhear the conversation in which the subscriber he has called is taking part.

The busy tone from generator 26 may then pass over contact 417, contact 318 and contact 320, which are closed at instants $t_m$ to the modulating electrode 204 of distributor 20. Subscriber $A_m$ therefore gets the busy tone; he may then hang up and the circuits go back to rest. When the subscriber hangs up the control circuit 300 does not receive any longer impulses 71 and cancels therefore impulses 78 on contact 307, which opens. The contact of relay 404 is closed and brings the register circuit to rest by the signals sent by generator 27. At the same time by conductor 36 the control circuit 300 brings the busy circuit 416 to its rest position.

In the case when the called subscriber is free, circuit 416 remains in the same condition since there are not impulses $t_n$ on the circuit comprising conductor 244, conductor 50, contacts 433r of relay 403, conductor 49, closed contact 308, conductor 46, contact 434 of relay 403 and conductor 55. Contact 417 is therefore open and contact 419 remains closed. In this way the busy tone is not applied to circuit BR. As soon as relay 403 has closed its contacts 435, 433t, 431, the impulses 84D from retardation lines 423, 424 and 425 pass over contact 435 and contact 419 and are applied to conductor 322 and close contact 321 at instants $t_n$. The closure of contact 431 enables the ringing current from generator 25 to pass over contacts 422 and 318 to devices 326 and 321. Since contact 320 is closed at instants $t_m$ the calling subscriber gets the ringing back tone. On the other hand closure of contact 435 applies impulses 84D on conductor 45. These impulses are applied to device 309 which changes their sign and gives out positive impulses 86D applied to conductor 244 by conductor 43. The presence of these impulses on conductor 244 denotes that subscriber $A_n$ is busy. If, before subscriber $A_n$ lifts his receiver, another subscriber calls him, this other subscriber will receive only the busy tone as explained previously. Moreover the impulses 86D applied to conductors 244 close the gate 240 at instants $t_n$ and prevent the eventual seizure of another connecting circuit by impulses $t_n$.

When the called subscriber lifts his receiver, impulses $t_n$ appear at point A and open contacts 318 by the following circuit: point A, conductors 232 and 51, contact 433t of relay 403, conductor 49, contact 308, closed at instants $t_n$ by impulses 84D of conductor 54, conductor 40. Contact 318 disconnects at this moment the ringing circuit from circuits $B_A$ and $B_R$ which are then in talking condition.

Circuit $B_A$, corresponding to subscriber $A_n$, is controlled by impulses 84D which come from the retardation lines through contact 435, contact 419 and conductor 322 and which close contact 321 at instants $t_n$.

Impulses $t_m$ modulated by subscriber $A_m$ are transmitted by point A, conductor 232, conductor 52, closed contact 307 and conductor 37, to filter 352 of circuit $B_A$. This filter gives back the original voice current, and on conductor 221, after contact 321, of modulated impulses at instants $t_n$.

Thus has been achieved the connection of subscriber $A_m$ to subscriber $A_n$.

The $B_R$ circuit of subscriber $A_m$ is unblocked by impulses at instants $t_m$. These impulses come from point D through conductor 53, a device 319 changes their sign and they close contact 320 at instants $t_m$. From point A, conductors 232 and 51, contact 433t, conductor 49, contact 308, conductor 40, and conductor 40' the impulses of subscriber $A_n$, modulated at instants $t_n$ are transmitted to filter 353 which gives out the original voice frequency while, after contact 320, modulated impulses appear on conductor 221 at instants $t_m$. Thus is also achieved the connection of subscriber $A_n$ to subscriber $A_m$.

As it has been shown previously, the call is under the control of the calling subscriber. If this subscriber hangs up the control circuit 300 no longer receives impulses 74 and is freed as explained above; on the contrary if the called subscriber hangs up, control impulses 84D are still supplied to device 308 by conductor 54 and the connecting circuit does not go back to rest.

Figures 4, 8:
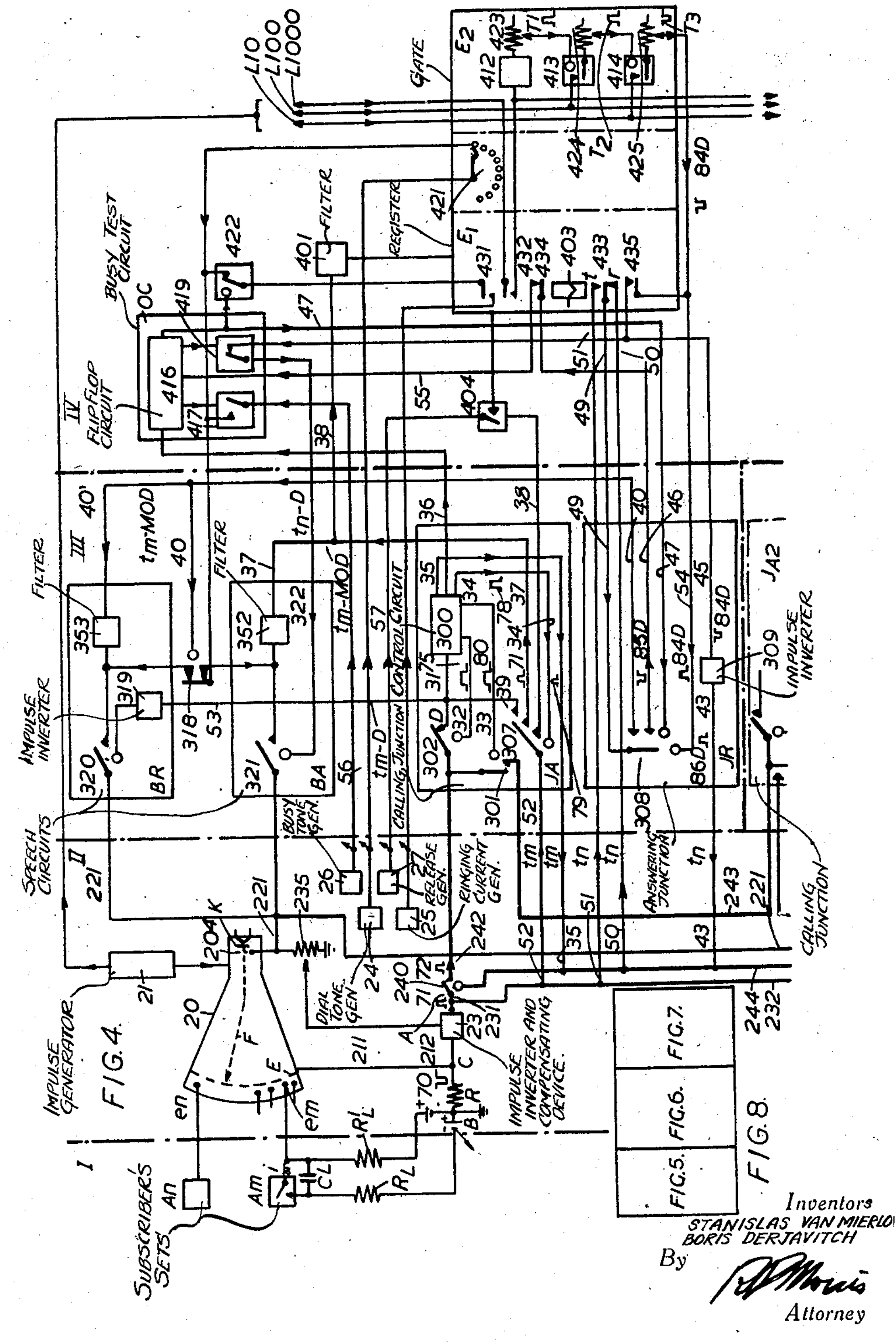
Fig. 4 is the schematic of a circuit incorporating features of the invention.
Fig. 8 shows how
Figure 5:
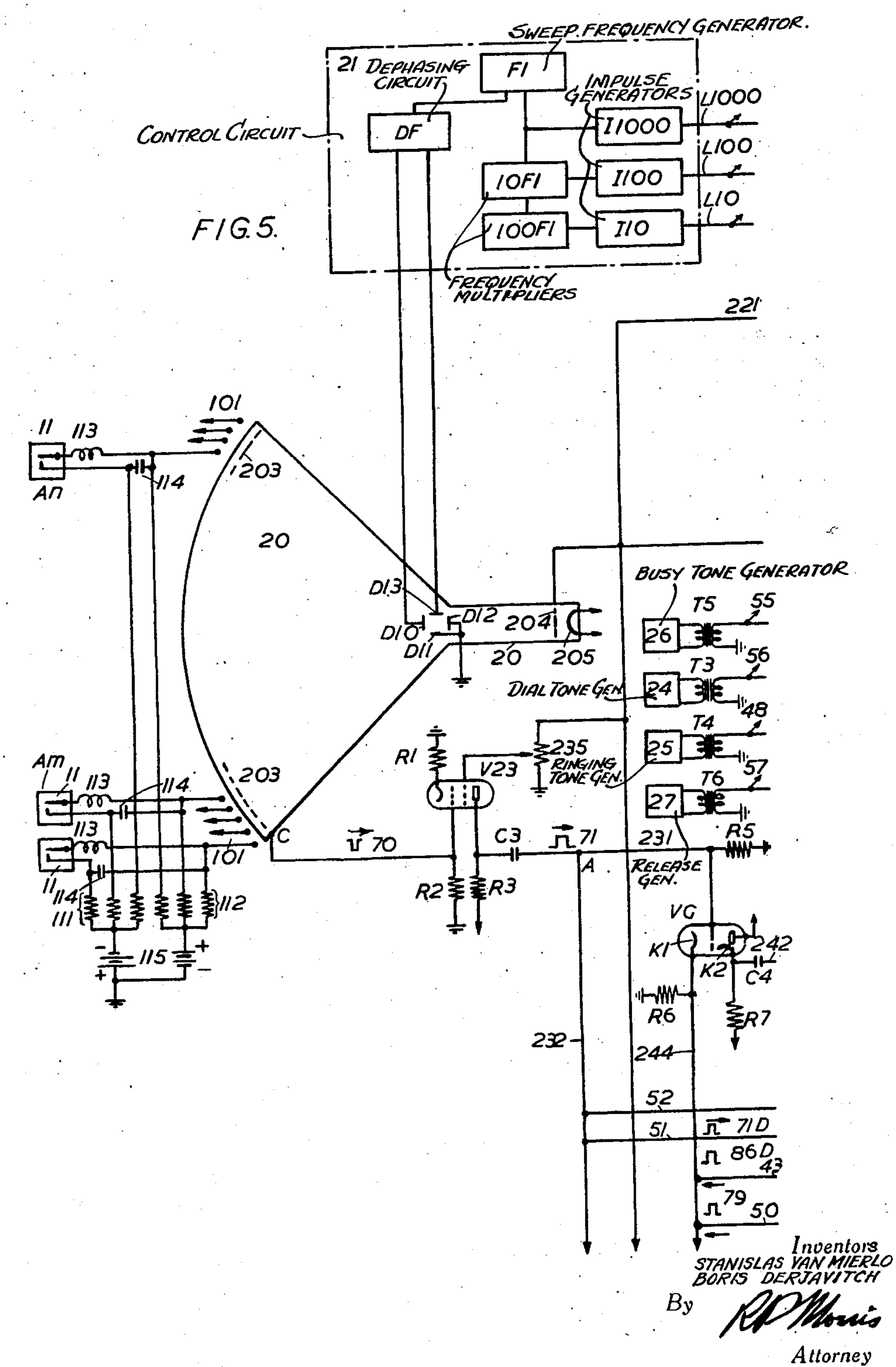
Fig. 5 shows circuits common to several subscribers.
Figure 6:
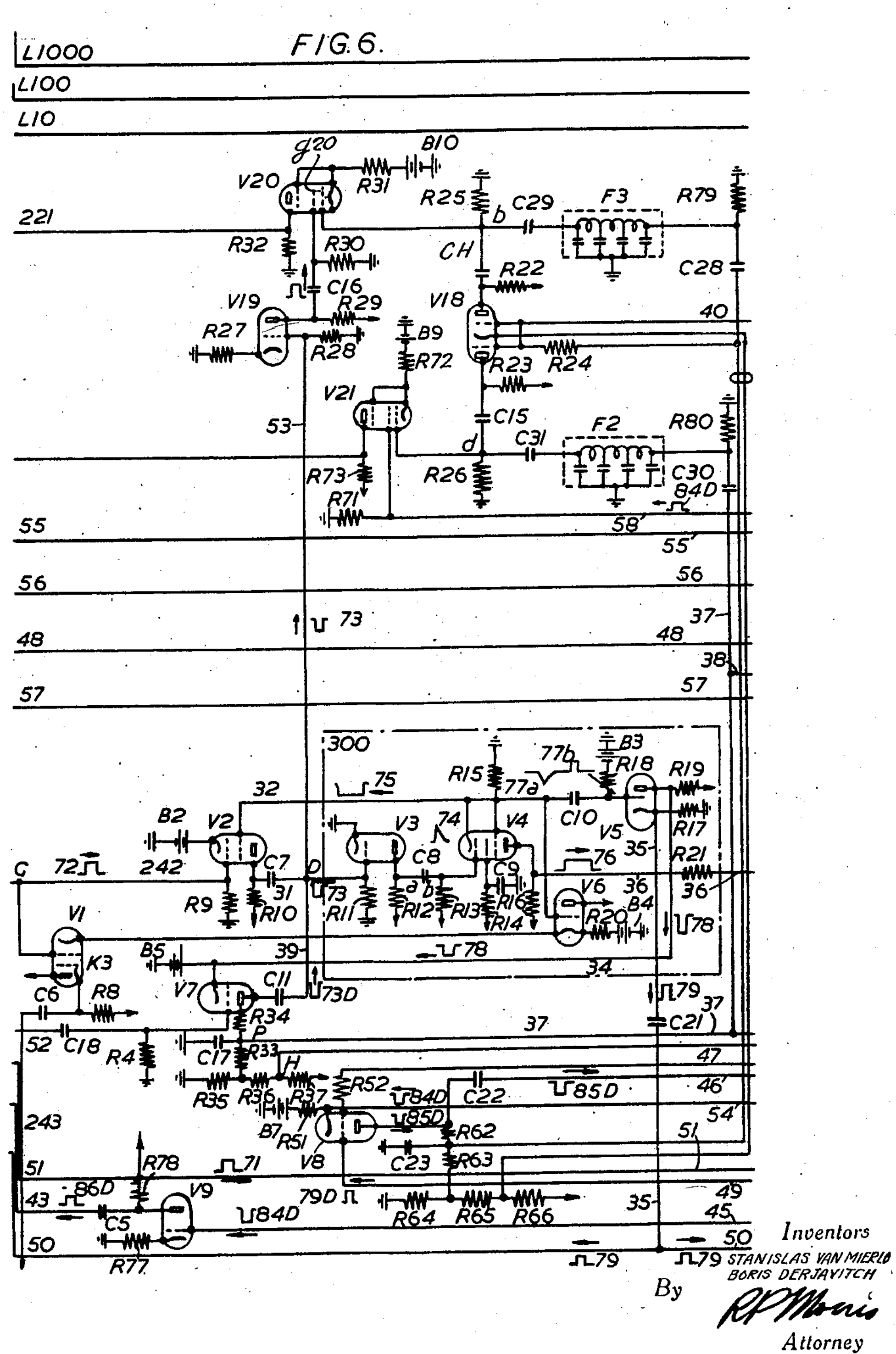
Fig. 6 shows an embodiment of a connecting circuit.
Figure 7:
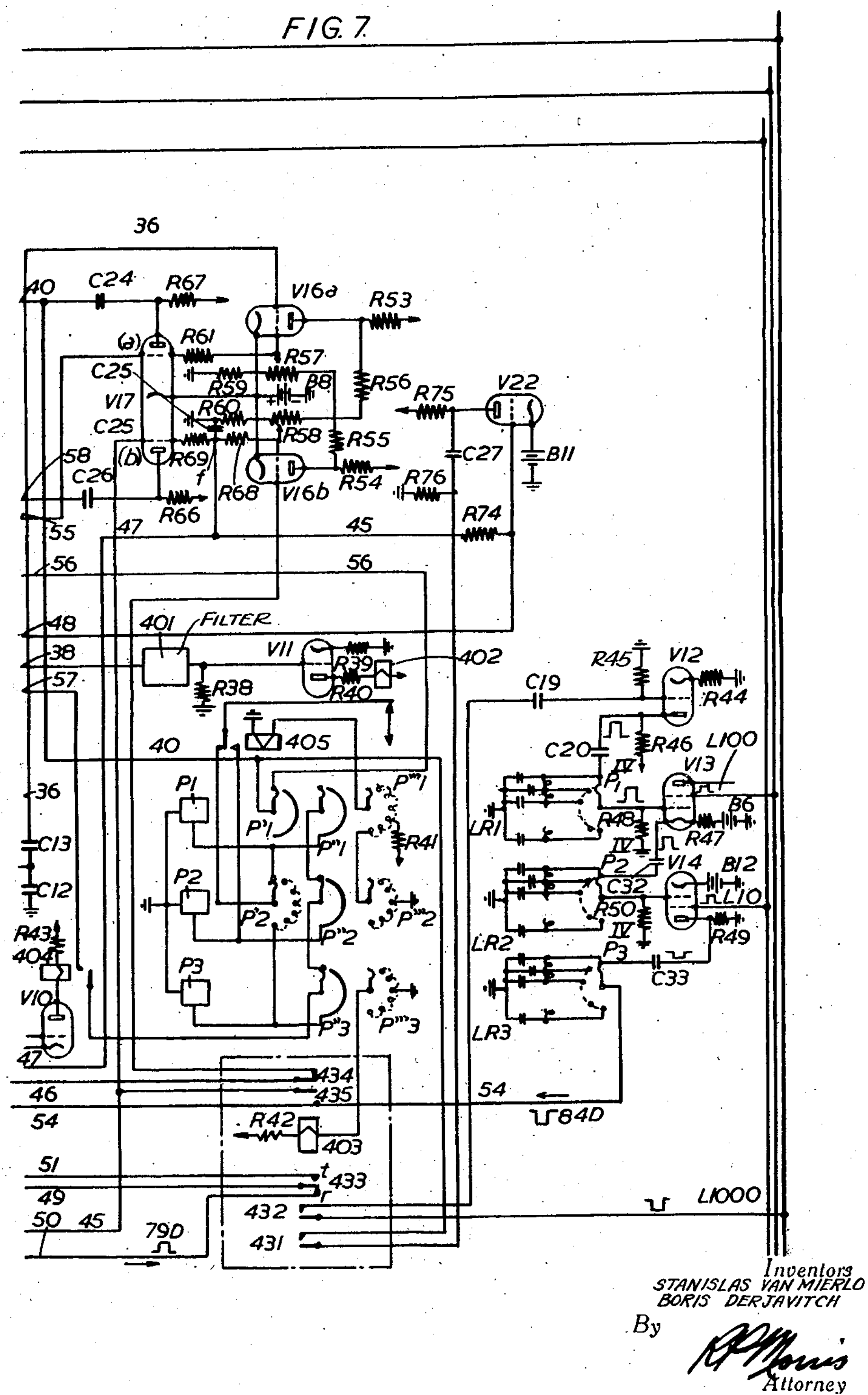
Fig. 7 shows a register circuit.

Having thus described the invention in its broad aspects we shall now describe in detail an embodiment in relation to Figs. 5, 6 and 7 assembled as shown on Fig. 8.

In these figures, the conductors connected to a high potential source have been terminated by an arrow.

The subscriber set which comprises a hook, a receiver, a transmitter, a dial and a ringer is schematically shown by a contact 11, reminding that when the subscriber has lifted his receiver a circuit has been completed in his sub-set.

Each subscriber loop comprises individual resistances 111 and 112, corresponding to resistances RL and R'L of Fig. 4, and a filter comprising an inductance coil 113 and a condenser 114; two grounded common batteries 115 (B on Fig. 4) are also provided.

The electron beam distributor 20, comprising a common electrode 203, electrodes 101 connected respectively to the telephone lines, deflecting plates D10, D11, D12, D13 and a modulating grid 204, has been described previously. Deflecting plates D10, D11, D12, D13 are connected to the control circuit 21 which comprises a circuit F1 which supplies the sweep frequency of the electron beam followed by a series of frequency multipliers, two in this example, and respectively designated by numerals 10F1 and 100F1, and by a dephasing circuit DF. Three impulse generators I1000, I.100, I.10 respectively controlled by circuit F1 and these multipliers supply the register circuit, through lines L1000, L100, L10 respectively, with three kinds of impulses, the duration and purpose of which have been explained previously.

Generators 24, 25, 26, 27 supply respectively the dialing tone, the ringing back tone, busy tone, and release impulses, and are connected to their respective circuits in the usual manner by means of transformers T3, T4, T5, T6 respectively.

When subscriber $A_m$ lifts his receiver negative impulses 70 coming from electrode 203 flow through a tube V23 corresponding to device 23 of Fig. 4. The cathode of this tube is brought to an appropriate potential by a resistance R1; its grid is provided with a leak resistance R2 and its anode with a load resistance R3 connected to the high potential. The compensating arrangement mentioned above comprises a potentiometer 235 which biases a second grid of tube V23.

Impulses 70 appear at the output of this tube, as explained previously, in the form of positive impulses 71 which are applied by a condenser C3 to point A.

The first positive impulse 71 which appears in A, at instant $t_m$ after the receiver of subset $A_m$ has been unhooked, is applied simultaneously on the grids of tubes VG (Fig. 5) and V7 (Fig. 6) and, by conductors 232 and 51, to contact 433t of relay 403 (Fig. 7). A bias resistance R4 is provided in the grid circuit of tube V7. Tube VG, common to all the connecting circuits, is a secondary emission tube with two cathodes K1 and K2 respectively to which appropriate biasing potentials are applied by resistances R6 and R7 respectively. The grid of tube VG is provided with a leak resistance R5. This tube supplies, by conductor 242 and condenser C4, positive amplified impulses 72 in phase with impulses 71. Normally, tube VG is blocked by the positive potential applied to its cathode K1. The first positive impulse 71 passes through, but the tube is blocked to the following impulses 71 generated at instants $t_m$ by the positive impulses 79 supplied by tube V5 through conductors 35, 59 and 244, and at instants $t_m$ by impulses 86D from tube V9 through conductor 43, condenser C5 and conductor 244. The impulse 72 produced in the output of tube VG by the first impulse 71 is directed to point G and applied to the grid of tube V1 which corresponds to device 301 of Fig. 4. This tube V1 is a secondary emission tube. Its first cathode is connected to the cathode of tube V6 and its second cathode K3 is connected to the high potential battery through a resistance R8 and to conductor 243 through a coupling condenser C6. This tube lets pass the first impulses of other calls in case the first connecting circuit is busy as will be seen later.

If we assume that the first connecting circuit is busy i. e. that tube V2 is blocked (this tube V2 corresponds to contact 302 of Fig. 4), tube V1 being unblocked, the first impulse $72_n$ of another call, in the output of tube VG, follows conductor 243 until the first free connecting circuit; when this impulse finds a free connecting circuit it is applied to a tube V2 of this circuit, the grid of which is provided with a leak resistance R9 and a plate resistance R10. When at rest tube V2 is blocked by the positive potential applied on its cathode, for instance by a battery B2, and it is unblocked by impulse 72. This impulse appears at point D as a negative impulse 73, after it has passed through a coupling condenser C7. This impulse 73 causes the control circuit 300 to operate, which comprises tubes V3, V4, V5 and V6.

The grid of tube V3 is provided with a resistance R11 and its anode with a load resistance R12. By condenser C8 the anode of tube V3 is connected to the control grid of tube V4 which is provided with a resistance R13 connected to the high potential. The screen grid of this tube is connected, on the other hand, to the high potential by a resistance R14 and to the ground by a condenser C9. The suppressor grid is connected to the cathode which is biassed by a resistance R15, and the anode connected to the high potential by a resistance R16. The cathode of tube V5 is connected to the ground by a resistance R17 and to conductor 35 to transmit impulses 79, its grid is negatively biassed for example by a battery B3 and a resistance R18, and its anode connected to the high potential by a resistance R19. Tube V6 is biassed by means of a battery B4 and a resistance R20.

The control circuit 300 sends on conductor 32 a square shaped signal 75 the leading edge of which coincides with the end of the first impulse 73 and the rear edge with the front edge of the following impulse 73. This square shaped signal, which is generated as explained below, is used in two different ways, as explained below.

In the case when the duration of the impulse 75 is not altered this impulse appearing on the cathode of tube V4 across the terminals of resistance R15 is applied to the grid of the tube V2, and blocks this tube during the interval of time separating two consecutive impulses 72. It blocks therefore tube V2 for all the impulses which come from other subscribers and places the connecting circuit in busy condition for the call which is characterized by instant $t_m$. The same signal is applied to the grid of tube V6 whose biassing potential is common to that of tube V1. This bias is such that the tube V1 is beyond its cut-off point in the absence of impulses. Thus the cathode of tube V1 is brought to a potential such that it is operative during the time interval separating two consecutive impulses, and this enables the impulses of other calls to pass through to line 243.

In the other alternative the negative impulse 75 is sent through a time constant circuit C10, R18 which gives two impulses, a negative impulse 77*a* and a positive impulse 77*b*. A battery B3, for example, applies to tube V5 a threshold potential which eliminates impulse 77*a*; the impulse 77*b*, produced at the end of impulse 75, is clipped and gives in the output of the tube V5 two short impulses, a negative impulse 78 on the plate of this tube and applied to conductor 34, and a positive impulse 79 on the cathode of this tube, applied to conductor 35 and to conductor 244 over conductor 50. This impulse 79 is thus applied to the cathode K1 of tube VG and makes the tube nonconductive for the impulses 71 which follow the first impulse. In this way all the following impulses 71 of the same calling subscriber will go through lines 232 and 52 to tube V7.

The cathode of tube V7 is polarized beyond its cut-off, for instance by means of a battery B5 and its grid is connected to a leak resistance R4. The negative impulse 78 is applied to the cathode of this tube and makes it conductive, this tube thus prepares the way for the impulses 71 coming from the same calling subscriber and which cannot go through tube VG. Thus are obtained in the output of tube V7 negative impulses 73D which are applied by a condenser C11 to point D by conductor 39 and to the control circuit 300.

The operation of tubes V3 and V4 which gives the square shaped signal 75 of duration $(T-t)$ will now be examined. The first negative impulse 73 on conductor 31 at the output of tube V2 is applied to the grid of tube V3. In the absence of impulses a plate current flows in this tube with a corresponding potential drop in the anode resistance R12 so that the plate potential of tube V3 is brought to a very low value U1. The negative impulse 73 which has an amplitude superior to the cut-off potential of tube V3 blocks this tube, annuls the plate current and brings the plate potential to a potential U2 about of the same magnitude as that of the high potential source. Tube V3 goes from potential U1, in the absence of impulses, to potential U2 during the passage of the impulse. Condenser C8, charged during the impulse, discharges exponentially and gives an impulse 74 between two successive impulses 73. The control grid of tube V4 is connected to the high potential source through a resistance R13 of very high value so as to be brought to a positive potential which is only slightly higher than the cathode potential. When one positive impulse from tube V3 is applied to the plate *a* of condenser C8, this plate is brought to potential U2 and the condenser charged through resistances R12, R15. The positive potential of the grid of tube V4 increases slightly by reason of the charging current flowing through resistance R15 and grid-cathode resistance of tube V4.

At the end of the impulse the plate *a* of condenser C8 is again potential U1. The decrease in the potential U2—U1 is transmitted to the grid of tube V4 which is in the form of a negative potential U1—U2. Tube V4, which during the passage of the impulse had a normal plate current, is suddenly blocked and condenser C8 discharges slowly through the grid leak resistance R13, resistance R12 and internal resistance V3 in parallel. The increase of the grid potential of tube V4 depends on a time constant which is substantially equal to the product of the capacity of condenser C8 by resistance R13. As soon as this potential reaches the cut-off potential of tube V4 this tube is unblocked and a plate current flows corresponding to the end of the square shaped signal. The steepness of the second edge of this square-shaped signal depends on the length of time necessary for the grid potential to increase from the cut-off potential to the cathode potential; the shorter this time interval the steeper is this second edge. It is advantageous that the discharge be rapid when the grid potential is zero with respect to the cathode. To this effect resistance R13 is connected to a high positive potential; and an extremely small grid current is sufficient to maintain its potential at the potential of the cathode.

Thus on the cathode and plate of tube V4 long impulses 75 and 76 of duration $(T-t)$ are obtained.

At the output of a decoupling circuit comprising a resistance R21 and a condenser C12 the impulses 76 go through condenser C13 and supply a D. C. potential on conductor 36 during the whole time that control circuit 300 is in the busy condition. As soon as subscriber $A_m$ hangs up this potential disappears, thus bringing the flip-flop circuit V16*a*—V16*b*( Figure 7) to rest as will be seen later. The connecting circuit being thus seized subscriber $A_m$ gets the dialling tone by the rest contact of step-by-step switch P1 of the register (Fig. 7) by the following circuit: Generator 24 (Fig. 5) common to all circuits, transformer T3, conductor 56, rest contact of switch P'1 (Fig. 7) conductor 40, grids of the double triode V18 (Fig. 6). In the anode circuits of this tube are provided two resistances R22 and R23 respectively, and a resistance 24 in the grid circuit. The dialling tone applied to the two grids of tube V18, is sent through condensers C14 and C15 respectively to points $b$ and $d$ which are grounded through resistance R25 and R26 respectively. This tone is therefore applied to the control grids of tubes V20 and V21. Tube V20 alone can be made operative by impulses 73 coming from point D on conductor 53 which are amplified and reversed in polarity by tube V19 which operates as a limiter. An appropriate potential is applied to the cathode of this tube by a resistance R27. In its grid circuit is provided a resistance R28, and an anode resistance R29 is connected between the anode and the source of anode potential. The impulses amplified by this tube flow through condenser C16 and apply a positive potential on the grid of tube V20 which grid is connected to ground through resistance R30. On the other hand the cathode potential of tube V20 is supplied by a resistance R31 and a battery B10 for example. Its anode is connected to a grounded resistance R32 and to the anode source for tube V21 over conductor 221.

Tube V20 being thus made conductive by impulses 73 transmits to subscriber $A_m$ the impulses modulated by the dialling tone through conductor 221, the modulating grid 204, the electron beam of the distributor 20 and the subscriber line. When subscriber $A_m$ hears this tone he can use his dial for sending digits which will increase the amplitude of the positive impulses at point A by a ratio of three halves.

It will be assumed that as previously the number of the called subscriber has three digits. The delayed impulses 78 from anode V5 change at instants $t_m$ the potential of tube V7 from a rest potential to the cut-off potential. The amplitude modulated impulses 71 applied to the grid of this tube V7 give rise to a mean plate current and therefore decrease the value of the potential between terminals of resistance R33 following a resistance R34 and condenser C17. Resistance R33 is on the other hand connected to the ground through a resistance R35 and to the high potential through resistances R36 and R37. Across terminals of resistance R33 negative impulses are collected which are transmitted by conductors 37 and 38 to filter 401, Fig. 7. This filter supplies therefore negative selecting signals which block the grid of amplifier tube V11 which is connected to the ground through a resistance R38. The cathode of this tube is connected to the ground by a resistance R39 and its anode controls a relay 402 through a resistance R40. Each time this tube is blocked by the negative selection signals relay 402 falls back and beats in synchronism with these signals. The electro-magnet of step-by-step switch P1 is operated by the following circuit: ground, winding of electro-magnet P1, rest contact P'2, rest contact of relay 402 and battery. At the end of the first signal relay 402 operates again and the electro-magnet falls back, selector P1 moves one step. This procedure is repeated for every signal.

After the first digit has been sent, which in the example considered is the hundreds, slow operating and releasing relay 405, which has not had the time to operate during the passage of brush of P'''1 over the terminals, operates by the following circuit: high tension, resistance R41, terminal P'''1, winding of relay 405 and the ground. By its make contact it closes the circuit of the electro-magnet of switch P2 which, for the second set of signals, corresponding to the tens, moves in the same way as step-by-step switch P1. Furthermore since switch P'1 has left its rest position there is no dialling tone.

When the line finder P2 stops at the end of the second set of signals on the terminals corresponding to the digits sent by subscriber $A_m$, relay 405 is short circuited by the row of terminals P'''2 as seen on the drawing. This relay therefore falls back and prepares by its rest contact a stepping circuit for the step-by-step switch P3 which operates under the control of impulses corresponding to the units as follows: ground, electro-magnet P3, terminal row P'2, rest contact of relay 405, rest contact of relay 402 and the battery.

After the reception of the third digit and the stopping of line finder P3 on the terminal corresponding to this digit, the number of the called subscriber has been registered. At this moment slow operating relay 403 operates over the following circuit: ground, terminal row P'''3 winding of relay 403, resistance R42, high potential. This relay fulfils during the busy test several duties which will be described later. It is clear that although a telephone relay has been described it is possible to use an electronic device for carrying out the functions of this relay 403.

The stopping of step-by-step switches P1, P2, P3 on some of their respective terminals characterizes the called number. The zero terminal corresponds to the rest position and the eleventh terminals to digit zero. The terminals of bank 4 of each step-by-step switch are respectively connected to retardation lines LR1, LR2, LR3.

At the end of the conversation the return to the rest position of the three step-by-step switches is controlled by relay 404 and tube V10. By its make contact relay 404 connects the brush P''3 to the common line 57 which supplies permanently to all the connecting circuits a potential interrupted at the rhythm of the numbering impulses, and which is supplied by return to rest impulse generator 27 through transformer T6.

At the end of the conversation the disappearance of impulses 71 at the input of tube V7 by conductors 232 and 52, through coupling condenser C18, causes a change in the potential of tube V10. The cathode of this tube is at a given potential with respect to the ground by means of resistances R35, 36, 37 (Figure 6). The passage of impulses 71 through V7 had given rise to a mean plate current and therefore to a potential drop between points P and H on resistances R36, 37, and the grid of tube V10 was thus biassed beyond cut-off and relay 404 at rest. The elimination of impulses 71 blocks tube V7, diminishes the potential at point P and brings back the grid of tube V10 to its normal biassing potential. The anode of this tube is connected to the high tension through a resistance R43 and the winding of relay 404. When tube V10 operates relay 404 is excited. The generator 27 then sends through conductor 57 and the make contact of this relay 404 impulses in the circuit of switch P3 which starts rotating and stops as soon as its brush P''3 reaches the rest position, since the operating circuit of electro-magnet is then open. At this moment impulses are sent by rest contact P''3 to brush P''2 which also goes back to rest and controls in the same way the home return of switch P1. The return to the home position of switch P1 frees the register for a new call since brush P'1 is back to its rest position connecting wires 56 and 40.

When relay 403 closes its contacts after the recording of the number of the called subscriber it connects by its contact 432 line L1000, connected to the impulse generator I1000, to the grid of tube V12 through a condenser C19. The cathode of this tube is connected to the ground through a resistance R44 and in its grid circuit is provided a resistance R45. The impulses L1000 are negative; they flow through tube V12 and appear with a positive polarity in the anode circuit of this tube which is connected to the high potential through a resistance R46 and to the retardation line LR1 through a connecting condenser C20. This retardation line LR1 corresponds to the hundreds digit of the called subscriber and is connected to terminals P1, IV of the step-by-step switch P1. As explained previously the delay introduced by each portion of the line comprised between two successive terminals of the step-by-step switch, called delay unit, is equal to the time interval taken by the electron beam of the distributor 20 to scan a hundred terminals of the distributor. If the step-by-step switch has stopped on the $n$th terminal, the impulse from line LR1 will correspond to the $n$th impulse from the hundreds generator L1000, the origin impulse being the first impulse of the hundreds. The positive impulse from line LR1, which is delayed by an amount corresponding to the hundreds digit of the number of the called subscriber, is applied to the grid of a tube V13, the other grid of which is connected to line L100 which transmits the impulses spaced apart by ten time intervals which are produced by generator I100. The cathode of this tube is brought to a positive potential with respect to the grid by means, for example of a battery B6 in series with a resistance R47. Normally this tube is blocked by the positive potential applied to its cathode and does not let the positive impulses L100 go through, but when it receives on its first grid the positive impulse from retardation line LR1 it becomes conductive and on its cathode appears a positive impulse due to the impulse L100 which was then applied to its second grid. This impulse is applied to the retardation line LR2 through a coupling condenser C32. At the output of this retardation line the delayed impulse is applied to the grid of a tube V14 provided with a leak resistance R50. The positive impulses L10 are applied to a second grid of this tube. Its cathode is brought to a positive potential with respect to the grid, for example by means of a battery B12, and its plate connected to the high tension through a load resistance R49. When a positive impulse from the retardation line LR2 makes this tube conductive a negative impulse appears on its plate due to the positive impulse L10 applied at this moment to its second grid. This impulse is sent to the retardation line LR3 by a coupling condenser C33.

Finally a negative impulse 84D is obtained on conductor 54 which is delayed with respect to the origin of time by an amount corresponding to the delay characterising the called subscriber.

It may be noted that retardation lines LR1 and LR2 may have only a limited number of sections, and may slightly distort the impulses without an adverse effect, but the retardation line LR3 which imparts to the tens' impulse from line L10 a delay characterizing the units must not distort the impulses, it must therefore be provided with a sufficiently high number of sections to fulfil this condition.

On the other hand although in the example described a register has been shown with step-by-step switches, any other kind of register, electromagnetic or electronic, may be used. It is also clear that other kinds of delay devices may be used without departing from the spirit of the invention.

The closure of contact 432 of relay 403 takes place very shortly before the operation of the other contacts, and this delay makes it possible to control whether the called subscriber is free or busy. When the called subscriber is busy this condition is characterised by the presence on line 244 of positive impulses 79D at instants $t_n$, supplied by the cathode of the tube V5 of the connecting circuit associated with the subscriber through a coupling condenser C21 and conductors 35 and 50 of this circuit as mentioned above. These impulses 79D flow through conductor 50 of the connecting circuit taken up by the calling subscriber $A_m$ and are applied by contact 433$r$ of relay 403 and conductor 49 to the grid of tube V8, which corresponds to the arrangement 308 of Fig. 4. The cathode of tube V8 receives through conductor 54, the local negative impulses 84D from the retardation line LR3. On the other hand it is brought to a positive potential by a battery B7, for example through a resistance R51, so that the impulses 84D unblock this tube. Moreover the grid of tube V8 is at a potential U3 determined by the arrangement V16$a$, V16$b$ and applied to it by conductor 47 and resistance R52 as shown later on. This potential is such that the impulse 79D at instants $t_n$ may flow through tube V8 and leave it in the form of negative impulse 85D on conductor 46 through a coupling condenser C22.

These impulses 85D are applied by contact 434 of relay 403, to the grid of a tube V16$b$ which is a part of the flip-flop circuit 416 of Fig. 4, which, at this moment, is in the free condition. This condition is characterized by the above mentioned potential U3 which biasses normally the grid of tube V16$b$. A plate current flows therefore in this tube which induces between the grid and cathode of tube V16$a$ a potential difference higher than the cut-off potential of this tube. The two tubes V16$a$ and V17$a$ biassed in the same way are therefore blocked. The negative impulses 85D applied to the grid of tube V16$b$ change its polarization in such a way that the grid goes from potential U3 denoting a free condition, to a potential U4 denoting a busy condition. This potential U4 displaces the potential of tube V16$b$ and V17$b$ beyond their cut-off point and blocks simultaneously these two tubes while tubes V16$a$ and V17$a$ are unblocked. Circuit 416 swings therefore into its busy condition.

The flip-flop circuit is of any known type. It may comprise two tubes V16$a$ and V16$b$ the anodes of which are provided with load resistances R53 and R54 respectively connected in a well known manner to the grid of the other tube through resistances R55 and R56 and potentiometers R57 and R58. These grids are also provided with leak resistances R59 and R60 respectively. The cathodes are biassed in parallel, for example by means of a battery B8 which may also supply a biassing potential to the double triode tube V17. The anode of tube V17$a$ is connected to a load resistance R67.

When after this change in the condition of the flip-flop circuit relay 403 operates its rest contacts 434 and 433$r$ and closes its make contacts 431 and 433$t$, the impulses 71D occurring at instants $t_n$ which flow on line 51 from conductor 232, are applied by contact 433t to the grid of tube V8, but do not go through since the potential of this grid has gone from potential U3 to U4. Thus, no current flows in the resistances R62 and R63 of the plate circuit of tube V8 and resistances R64, 65 and 66 connected between the ground and the high potential act as a potentiometer bringing the grid of tube V8 to its cut-off potential.

Tube V18 is thus at its cut-off potential and receives on its grid the busy tone from generator 26 and transformer T5 conductor 55, tube V17a and a coupling condenser C24. The busy tone is thus applied to the grid g20 of tube V20 which is made conductive as explained above by the impulses 73D coming from tubes V7 and V19. This busy tone is sent to the calling subscriber $A_m$ by conductor 221. When the subscriber hears this tone he hangs up his receiver. At the same time, as explained above, tube V8 is blocked by potential U4 which is applied by conductor 47 from point f of circuit V16; there is no modulating potential across resistance R63 so that the second triode of tube V18 remains blocked and the calling subscriber cannot overhear the conversation in which the subscriber he is calling is taking part.

Point f is connected to the grid of tube V16b by a resistance R68 and to the grid of tube V17b by a resistance R69 and it is decoupled by a condenser C25.

When, after he has received the busy tone, the calling subscriber hangs up, the positive impulses 71 disappear from conductors 232 and 52 and are no longer applied to the grid of tube V7. The mean current which flows when there are impulses in the plate circuit of tube V7 disappears and the potentials at the terminals of resistances R33 and R36 are brought down from the cut-off potential to the normal potential of tube V10 which unblocks. Relay 404 through which flows the plate current of V10 operates and closes by its make contact the circuit of the electro-magnet of the step-by-step switches P3, P2, P1 which go back to rest by means of the interrupted potential supplied by generator 27 as previously explained.

On the other hand the disappearance of impulses 71 stops the control circuit 300 and therefore impulses 85D. Tube V16a is then again conductive and the flip-flop circuit goes back to its free position.

When the called subscriber is free there are no impulses 79D on conductor 50; therefore no impulses reach the grid of tube V8 by contacts 433r of relay 403. The flip-flop circuit 416 remains in its free position. When relay 403 opens its contact 433r and 434 and closes its contact 433t, 435 and 431, the impulses 84D occurring at instants $t_n$, which characterise the called subscriber, are applied on the one hand to the grid of tube V17b by contact 435 and on the other hand to the grid of tube V9. They appear with a positive polarity on the plate of tube V17b which is connected to the high potential through a load resistance R66 and, by a coupling condenser C26 and conductor 58, are applied to the grid of tube V21 (Fig. 6). This grid comprises a leak resistance R71. On the other hand the cathode of this tube is biassed beyond its cut-off potential for example by a battery B9 through a resistance R72 and its plate is connected to a load resistance R73. The positive impulses from tube V17b bring this tube V21 to the cut-off potential. The current of the signalling generator 25 flows through transformer T4, conductor 48 and closed contact 431 through tube V22 which is unblocked. The cathode of tube V22 is biassed for instance by a battery B10; its anode is connected to a load resistance R75 and an appropriate grid potential is applied to it from point f through a resistance R74. The ringing current from generator 25 flows through this tube and, through a coupling condenser C27, is applied to contact 431. Resistance R76 constitutes another load. This current is then applied to conductor 40 and to the grid of tube V18 which is unblocked at this moment. As long as the called subscriber has not lifted his receiver no impulse from conductor 232 is applied to the grid of tube V8 by conductor 51 and contact 433t. Since the plate current of this last tube is zero the potential drop across resistances R63 and R65 which biassed the grid of tube V18 with respect to its cathode, supplies to this tube a cut-off potential. When the called subscriber lifts his receiver impulses 71D appear on the grid of tube V8. At this moment a plate current flows in this tube and causes in resistances R63 and R65 a potential drop which brings the bias voltage of tube V18 beyond its cut-off potential.

It may be noted that the opening of contact 431 during the transmission of digit impulses prevents the sending of the dialling tone to the calling subscriber.

At the output of tube V18 the potential induced by the ringing generator 25 is applied simultaneously to the grid of tube V20 for the calling subscriber and V21 for the called subscriber by points b and d respectively. As explained previously, since tube V20 is unblocked by impulses 73D and tube V21 is unblocked by impulses 84D, which have flown through tube V17b, the calling subscriber hears through tube V20 the ringing current sent to the called subscriber through tube V21.

On the other hand impulses 84D show that subscriber $A_n$ is busy. These impulses are applied by contact 435 of relay 403 to conductor 45 and reach the grid of tube V9. The cathode of this tube is brought to an appropriate biassing potential by resistance R77 and a load resistance R78 is provided in its plate circuit. Impulses 84D flow through tube V9 and appear as positive impulses 86D at instants $t_n$ these latter impulses are applied to the cathode K1 of tube VG through a condenser C5 and by conductors 43 and 244 as explained previously. They bring the potential of the grid of tube VG beyond its cut-off potential at instants $t_n$ and thus prevent the impulses $t_n$, produced by the called subscriber when he has lifted his receiver, from reaching the test line 242 and seizing another connecting circuit.

On the other hand contact 435 is closed only after the opening of contacts 434 and 433r to avoid superfluous changes in the condition of circuit 416.

When the called subscriber lifts his receiver the impulses 71D at instants $t_n$ which are thus generated, can flow only on line 232, since, it has just been seen, tube VG is blocked at instants $t_n$. These impulses 71D flow on conductor 51, contact 433t of relay 403 and are applied by conductor 49 to the grid of tube V8 which is unblocked at the same instant, as seen previously, by impulses 84D and the D. C. potential U3. These impulses therefore cause a plate current to flow in the output circuit of tube V8 and this current changes the potential across resistances R63 and R65 and therefore the bias of tube V18 which is thus blocked. In this way, the ringing tone does not flow towards tubes V20 and V21.

When the called subscriber talks, the modulated impulses 71D are applied to the grid of tube V8 by the circuit which has just been described and appear between terminals of resistance R63. They are applied to filter F3 through a condenser C28 and a terminating resistance R79. The voice currents which flow out of this filter are applied through a condenser C29 to the first grid of the mixer tube V20. On the other hand impulses 73 issuing from point D flow through tube V19 which is operating as a limiter. At the output of tube V19 appear unmodulated positive impulses which are applied to the second grid of tube V20. These impulses unblock this tube. The voice currents modulate the impulses which arrive on the first grid g20 of tube V20, and impulses are collected in the output circuit of this tube at instants $t_m$ with a level which is a linear function of the instantaneous potential of the first grid, i. e. of the voice currents. These modulated impulses are transmitted by line 221 and the grid 204 of distributor 20.

When the calling subscriber talks the impulses 71 applied to the grid of tube V7 by conductors 232 and 52 and condenser C18, are collected across terminals of resistance R33 since tube V7 is unblocked at instants $t_m$ as seen previously. The impulses demodulated by this tube flow on conductor 37 and are applied to filter F2 by a condenser C30 and a terminating resistance R80. In a similar way to that which has been described in relation to the impulses transmitted by the called subscriber the voice currents from filter F2 are applied to the first grid of tube 21 which is unblocked at instants $t_n$ by the impulses which are applied to it from tube V17b by conductor 58 as explained previously, and thus impulses are collected in the output of tube 21 which are modulated at instant $t_n$ with a level linearly proportional to the instantaneous amplitude of the potential of the first grid, i. e. the voice current. These modulated impulses are transmitted to subscriber $A_n$ by line 221 and grid 204 of distributor 20.

Thus has been realized a two-way connection between the subscribers. At the end of the conversation the circuits go back to rest as explained previously when the calling subscriber hangs up.

While we have described a particular embodiment of our invention for purposes of illustration it should be understood that various modifications and adaptations thereof may be made within the spirit of the invention as set forth in the appended claims.

What we claim is:

1. A switching system of the type wherein a number of channels of communication are represented by individual time positions in a recurring cycle of time positions comprising a common conductor connected to said channels, a lesser number of connecting circuits than there are channels connected to said common conductor in cascade arrangement, means in each connecting circuit for responding initially to an impulse at any time position, means controlled by said responding means for by-passing any subsequent impulses at other time positions so that they pass to the next succeeding connecting circuit, and means controlled by said responding means for blocking from the other connecting circuits subsequent repeated impulses at the time positions causing the initial response.

2. A telecommunication switching system of the type wherein a number of communication channels are allotted to individual time positions in a recurring cycle of time positions, and wherein information is passed from one channel to another by displacement in time of information originating at the time position allotted to one of such channels so that it is receivable at the time positions allotted to another of such channels comprising a number of connecting circuits having inputs, means for connecting the inputs of said circuits in cascade arrangement, means for passing impulses at any of the said time positions to the first of said connecting cascaded circuits, means in each connecting circuit and connected to the input of said circuit for responding to a first impulse at any time position, means controlled by said responding means and operative after said first impulse to prevent response to impulses at other time positions and to bypass them on to the next succeeding connecting circuit, means for selectively displacing in time impulses originating at one time position so as to produce like impulses at another time position, and means associated with the said connecting circuits and controlled by said impulse-displacing means for rendering said circuits unresponsive to impulses originating at the time position to which such impulses have been displaced as aforesaid.

3. A switching system wherein a number of channels of communication are represented by individual time positions in a recurring cycle of time positions and wherein a lesser number of connecting circuits than there are channels are available for connection to the said channels comprising means for connecting the inputs of said circuits in cascade arrangement, means for emitting impulses from a channel initiating a call at the individual time positions by which said channel is represented, means for applyng said impulses to the first of said connecting circuits, an electronic control circuit in each connecting circuit responsive to a first impulse received by said circuit for generating controlling impulses of different time durations, a first electronic gate in each circuit controlled by one of said control impulses for disabling said connecting circuit except at the instant characterizing the calling channel to avoid seizure of this circuit by another channel, a second electronic gate controlled by one of said controlling impulses for connecting impulses from other channels through to the succeeding connecting circuit between successive instants characterizing the first calling channel, means for delaying impulses from said calling channel for a time period corresponding to the time between an impulse characterizing the calling channel and an impulse characterizing the called channel, and means for operating the first electronic gates in all the connecting circuits under control of the delayed impulses from the calling channel, so as to avoid the seizure of another of said connecting circuits by the said delayed impulses.

4. A switching system, as claimed in claim 15, further comprising a busy condition circuit comprising a flip-flop circuit having a first and a second rest position, means for causing said flip-flop circuit normally to assume said first position, means for causing said flip-flop circuit to assume its second position when the channel with which connection is required is busy, an electronic gate, means for causing said flip-flop circuit when in its second position to close said electronic gate at the instants characterizing the calling channel for preventing the calling channel from being connected to the channel with which connection is required.

5. A switching system as claimed in claim 4 in which the first electronic gate is closed by the action of the impulses from the control circuit of each busy connecting circuit, thereby diverting the flow of the impulses from the calling channel through an alternative path to the connecting circuit, a second electronic gate in each connecting circuit controlled by impulses from the control circuit and opened only at the instants when the impulses controlling the said circuit occur, and applying the impulses from the calling line to said controlling circuit, a third electronic gate in each connecting circuit controlled by other impulses from the control circuit of this connecting circuit, opened between the instants when the impulses controlling said circuit occur and enabling the impulses of other calls to reach the following circuits, a fourth electronic gate in each connecting circuit opened only at the instants when the impulses controlling this circuit occur and enabling the impulses following the first one to reach this circuit by the said alternative path, and a fifth electronic gate in each connecting circuit controlled by the impulses delayed at the instants characterising another channel to which connection is required and opened at these instants to let pass towards a busy condition circuit the impulses of the said other channel when the said other channel is busy.

6. A switching system as claimed in claim 5 having a busy condition circuit comprising a flip-flop circuit controlled by the impulses of a busy called channel transmitted through the said fifth electronic gate, a sixth electronic gate controlled by the said flip-flop circuit under the action of the impulses of the calling channel and closed at the instants characterising this calling channel preventing the said calling channel from receiving impulses originating in the said busy called channel.

7. A switching system as claimed in claim 3 comprising in combination an electronic distributor whose electrodes are respectively connected to a plurality of channels of communication, a first electronic gate connecting the common electrode of the distributor to the first of the electronic connecting circuits, the said electronic gate being locked at the instants corresponding to a calling channel, a plurality of register circuits each associated respectively with a connecting circuit, and delay devices adjusted by the register circuit associated with the connecting circuit under the control of the calling channel and imparting to the impulses of the calling line a delay corresponding to the instants characterizing the said called channel.

8. A switching system of the type wherein a number of channels of communications are represented by individual time positions in a recurring cycle of time positions comprising a common transmission medium for said channels, a first and a second connecting circuit, responding means in each of said connecting circuits for responding to an impulse at any time position, a connection from said transmission medium to both said responding means, blocking means interposed between said transmission medium and said second connecting circuit normally blocking the passage thereto of impulses from said transmission medium, means responsive to the reception of an initial impulse by the responding means of said first connecting circuit for by-passing any subsequent impulses at other time positions and for unblocking said blocking means with respect to impulses only of said other time positions.

9. A switching system of the type wherein a number of channels of communication are represented by individual time positions in a recurring cycle of time positions comprising a common transmission medium for said channels, a first and a second connecting circuit, responding means in each connecting circuit for responding initially to an impulse at any time position, a connection from said transmission medium to both said responding means, blocking means interposed between said medium and said second circuit normally blocking the passage thereto of impulses from said medium, means controlled by said responding means for by-passing any subsequent impulses at other time positions to the next succeeding connecting circuit, and for unblocking said blocking means only with respect to impulses at time positions other than that of the impulses causing said initial response.

10. A switching system wherein a number of channels of communication are represented by individual time positions in a recurring cycle of time positions comprising a common transmission medium connected to said channels, means between said medium and said channels for feeding impulses to said medium representative of calling channels, a plurality of connecting circuits, means in each of said circuits responsive to impulses at any time position, an input circuit for each of said connecting circuits, one of said input circuits being connected to said common medium, means controlled by the responsive means of each circuit when an impulse has been received thereby for preventing subsequent repetitions of the same impulse from being received by the input circuit of any connecting circuit, and means also controlled by said responsive means when an impulse has been received thereby for disconnecting said responsive means from its associated input circuit during the times of the other impulses of said cycle and connecting said input circuit to the input circuit of another connecting circuit during such times.

STANISLAS VAN MIERLO.
BORIS DERJAVITCH.

References Cited in the file of this patent

UNITED STATES PATENTS

| Number | Name | Date |
|---|---|---|
| 1,905,359 | Affel | Apr. 25, 1933 |
| 2,277,192 | Wilson | Mar. 24, 1942 |
| 2,341,919 | Hubbard | Feb. 15, 1944 |
| 2,356,514 | Graham | Aug. 22, 1944 |
| 2,356,519 | Hubbard | Aug. 22, 1944 |
| 2,379,715 | Hubbard | July 3, 1945 |
| 2,387,018 | Hartley | Oct. 16, 1945 |
| 2,462,896 | Ransom | Mar. 1, 1949 |
| 2,490,833 | Ransom | Dec. 13, 1949 |